United States Patent Office 3,694,372
Patented Sept. 26, 1972

3,694,372
MINUTE CAPSULES AND THEIR MANUFACTURE, EN MASSE
Jerrold L. Anderson and Robert C. Haines, Jr., Dayton, and Thomas C. Powell, West Alexandria, Ohio, assignors to The National Cash Register Company, Dayton, Ohio
No Drawing. Filed Dec. 8, 1970, Ser. No. 96,233
Int. Cl. B01j *13/02;* B44d *1/02*
U.S. Cl. 252—316
9 Claims

ABSTRACT OF THE DISCLOSURE

A method is disclosed for preparing, en masse, in a liquid manufacturing vehicle, minute capsules having walls of polymeric materials such as ethyl cellulose and particles of core material such as urea and sodium chloride. Development of the process included the discovery that the particle size of the encapsulated material decreases as the concentration of wall material is increased. Additionally, increasing the concentration of core material also controls the particle size of the capsule. The produced capsule is a unit with a high intra surface area to volume ratio.

---

This invention relates to a process of manufacturing minute capsules, en masse, in a liquid manufacturing vehicle and to the capsule product, each capsule comprising a core and a seamless protecting wall surrounding the core. By "minute capsules" are meant capsules from a few microns to several thousand microns.

In known processes for the manufacturing of minute capsules, en masse, each capsule consisting of core entities and a rigid seamless wall formed around it, an agitated liquid vehicle is used in which the core entities and the liquid wall-forming materials are dispersed, so that the wall material in liquid form can be deposited on the core entities to form capsules with liquid walls. These liquid walls finally are converted into rigid walls. In these known processes, the wall material is converted to a rigid state by warming and cooling, with agitation within a specified temperature range. Before warming, in the first instance, the system consists of three immiscible phases:

(a) A major part by volume of low-viscosity liquid vehicle, a part of which vehicle at warm temperature is a solvent for the wall material, (b) The polymeric wall material to be dispersed in the system wherein at least a portion of the wall material is dissolved by part of (a) when the system is warm and the remainder being present as an immiscible liquid, (c) Particles of core material immiscible with (a) or (b) but wettable by (b) in solution.

These systems can be established in any order of addition, warm or cold, agitated or not, and the process can be interrupted and resumed by the re-establishment of the heating and agitation.

The insolubilizing effect of a drop in temperature on the deposited liquid walls, from the warm condition, results in the departure of the solvent into the vehicle phase, where it can remain for recycling.

By the use of polymeric material that rigidizes by phasing out of solution in a condensed rigid form on being cooled, without retention of the solvent, capsules are formed having walls which are stable when removed from the system, even when later exposed to warm environments.

It now has been found that the encapsulated aggregates can be prepared in relatively narrow particle size distributions with the resulting granulated product being essentially void of powder fines. Development of the process included the discovery that the particle size of the resulting encapsulated aggregates decreases as the concentration of the polymeric wall material increases in the system of the process. Particle size of the encapsulated aggregates can be controlled further by regulating the ratio of core material to polymeric wall material in the system of the process i.e., increasing the ratio further decreases particle size. In addition, the encapsulated aggregates of this invention are a high surface area particle due to intraparticle porosity. Previous attempts to reduce particle size generally comprised decreasing the concentration of polymeric wall material; however, such a decrease usually failed to produce aggregates of reduced size.

The process of this invention is unique in that it offers an improved method for preparing relatively narrow particle size distribution, porous encapsulated aggregates, with the additional feature that the encapsulated particles are void of powder fines. The encapsulated aggregates are resistant to agglomeration, i.e., clumping and caking. Test data shows that encapsulated aggregates sorb the same amount of water as unencapsulated aggregates, yet have reduced agglomerating tendencies when exposed to humid environments.

These microencapsulation techniques are employed to provide hydroscopic cloud-seeding particles which are resistant to caking and agglomeration incurred by normal storage, handling and dissemination operations. Specifically, these encapsulation techniques have been employed to produce small, porous encapsulated aggregates of two, select fog-seeding materials, urea and sodium chloride, wherein the polymeric wall material is ethyl cellulose. The successful dispersal of warm-fogs by seeding the clouds is dependent upon the hydroscopic properties and the particle size of the seeding particle. A characteristic which has plagued successful utilization of hydroscopic fog-seeding materials has been the agglomeration of specially sized fog-seeding materials during storage, handling and dissemination thereby impairing their efficiency and effectiveness during their fall through a fog. The encapsulated aggregate produced by the process of this invention can be employed in the dispersal of warm-fogs by seeding.

Regardless of its special adaptation for the encapsulation of urea or sodium chloride in ethyl cellulose by use of cyclohexane, the process has a wide range of use with regard to the encapsulation of other core materials, and to the use of other capsule wall materials, solvents, and phase-separation-inducing solutes, and with regard to the temperature ranges which such other materials require.

Of particular interest as capsule wall materials are polymeric materials that have substantial zero solubility in a qualified solvent at room temperature (20 degrees centigrade to 25 degrees centigrade) and increasing solubility therein as the temperature is increased, so that a system can be prepared wherein a dissolved polymeric material deposits on the core entities as liquid walls which shrink into a rigid state as the temperature is lowered. The forcing out of the polymeric material from solution and its solidification should occur somewhat above room temperature for convenient manufacturing practice, if room temperature is the norm. However, without departing from the novel principles of the invention, systems can be created to fit processing temperature ranges having limits above or below room temperature, if such be appropriate for the situation, as in the encapsulation of cold-sensitive or heat-sensitive core materials.

The solvent for the polymeric wall material in this process is part of the vehicle in the cold state of a system, and thus, stated reversely, the vehicle in part is the wall material solvent in the warm state of the system. Therefore, an undivided part of the solvent is sometimes part of the vehicle and sometimes part of the liquid wall material. The vehicle is of generally low viscosity and contains, in addition to the solvent, a minor part of a solute, giving up a part of the solvent to the polymer in the warm state. The solute can be an organic low-viscosity liquid or a polymeric material. By furnishing such vehicle solvent with a solute incompatible with the wall-forming polymeric material, to establish a major phase of low viscosity, the wall-forming material as a more viscous solution can exist as a separate phase in the vehicle and can be broken up in the vehicle, by agitation, and dispersed as minute liquid entities in the warm system, ready to coat core material particles that can be present in said system. The separate dispersed entities of viscous warm liquid solution of wall material coat the particles of core material to a thickness limited by the shearing effect of the agitation, the later cooling thereof causing the walls to give up the solvent. The walls thereupon shrink on the core particles into a rigid, protective coating.

Any of the vehicle materials lost by entrainment with the recovered capsules, by evaporation or otherwise, can be replaced, if desired, and employed for recycling.

While attention has been directed to a room-temperature norm for capsule recovery, it should be noted that such is just a convenient temperature recovery environment. The insolubility-temperature point of the dissolved wall material in a given system is the controlling factor as to the temperature range over which the process takes place. If rigid walls are obtained by cooling the liquid deposit on capsules from an elevated temperature to a temperature lower than room temperature, the capsules are recovered from the system at that lower temperature. Rigid capsules completed at below room temperature, and removed, will not disintegrate, by melting of the walls, at room temperature or higher in the absence of a solvent, unless the polymeric material alone naturally has a liquid state at such higher temperature. Likewise, capsules with rigid walls recovered above room temperature can be used at room temperature and below.

In the recycling of a residual system, the most efficient method of refurnishing the system with capsule ingredients is to furnish what has disappeared in the making of the previous batch of capsules, but such can be varied if thinner or thicker capsule walls are required for the next batch, or if the particle size of the core materials and the degree of agitation, or both, are varied, that require correspondingly different ratios of capsule-forming material.

The chosen polymeric material must be used in such concentration that, in its existence in solution in the system as a separate liquid phase, it will have a viscosity of between 100 and 10,000 centipoises in order to cling to small core material particles and to wrap around them to form a complete liquid shell. Therefore, if polymeric materials are used that have characteristics different from the characteristics of the materials disclosed in the examples to follow, concentrations different from those which appear from the proportions of materials given in the examples can be required to give a dispersed liquid solution of polymeric wall-forming material having the necessary viscosity to wrap around the core particles.

The core material can be liquid if it can exist as a separate phase in the system under agitation, is stable to the necessary heating and cooling of the system, and is compatible with the liquid solution of wall-forming material from a non-reaction and wetting behavior standpoint.

The amount of polymeric wall material employed in the process ranges from 0.5 to 10 parts by weight of polymeric wall material per 100 parts by weight of solvent, preferably 2 to 7 parts by weight of polymeric wall material per 100 parts by weight of solvent. The phase ratio of core material to polymeric wall material ranges from 1:1 to 50:1, preferably 10:1 to 30:1. Note, that an increase in polymeric wall concentration results in an increase in core material concentration as well.

The encapsulated aggregates of this invention are a high surface area particle due to intra-particle porosity. Generally, the encapsulated material has a specific surface area ratio ranging from 2:1 to 10:1, preferably 4:1 to 10:1. The specific surface area ratio is the ratio of external and intra surface area of encapsulated material per volume to external surface area of the unencapsulated material per volume. In effect, the intra-particle porosity of the capsule aggregates of this invention are dry, high surface area particles. By encapsulating the core materials of this invention, 2 to 10 times more surface area per volume can be exposed without having undesirably small powder fines present. Further, the encapsulated sorption properties are essentially equivalent to those of the unencapsulated core materials without having agglomeration or caking problems.

The advantages of this invention are further illustrated by the following examples. The reactants and the proportions and other specific conditions are presented as being typical and should not be construed to limit the invention unduly.

EXAMPLE I

The polymeric wall material used in preparing the small aggregates was Dow Chemical's Standard 100 Grade of ethyl cellulose. The viscosity range and ethoxyl content of the polymer allows cyclohexane to be used both as a solvent and a non-solvent for the polymer in the encapsulation process. That is, the solvent behaves as a theta solvent with the theta temperature being above room temperature but less than 81° C. (the boiling point of cyclohexane is 80–81° C.). Encapsulation is accomplished in the following manner.

Cyclohexane is placed in an agitator-equipped vessel. Ethylcellulose is added to yield the desired polymer concentration (usually between 0.5 g. and 5.0 g. of polymer per 100 g. of solvent). The core material, urea or sodium chloride, is added to yield the desired phase ratio (i.e., the ratio of core-material to coating polymer). Usually phase ratios of from 10:1 to 20:1 are employed, although, this range is not limiting. The encapsulation mixture is agitated and heated to 80° C. during which time the coating polymer is liquified, the polymer being partially miscible with the solvent and the remaining portion of the polymer being a polymer liquid which is immiscible with the solvent. With continuing agitation, the mixture is cooled to 25° C. during which time coacervation-phase separation of the polymer occurs, the encapsulation or granulation of the particles results. Also during the cooling cycle, the deposited polymer becomes gelled when cooled below the theta temperature. Upon completion of the cooling cycle, the agitation is ceased and the mixture is filtered. The encapsulated product is collected and is voided of residual solvent by common drying methods, such as tray, fluidized-bed, vacuum, etc. Finally, the dry, free-flowing product is passed through a coarse screen to remove an extremely small amount (ca. 1%) of coarse processing "residue" created during the encapsulation-drying operation.

The effect of polymeric wall material concentration and phase ratio on particle size of urea encapsulated according to the above-described procedure is shown in Table I.

TABLE I

| Grams of ethyl cellulose per 100 grams of cyclohexane: | Median diameter in microns |
|---|---|
| Phase ratio [1] 10:1— | |
| 1 | 85 |
| 2 | 76 |
| 3 | 49 |
| 4 | 47 |
| Phase ratio [1] 15:1— | |
| 1 | 62 |
| 2 | 44 |
| 3 | 43 |
| 4 | 40 |
| Phase ratio [1] 20:1— | |
| 1 | 42 |
| 2 | 34 |
| 3 | 35 |
| 4 | ([2]) |

[1] Phase ratio is the weight ratio of core material to polymeric wall material.
[2] Not determined.

This data clearly demonstrate that at a given phase ratio, the particle size of encapsulated urea decreases as the concentration of ethyl cellulose increases. For example, at a phase ratio of 15:1, the median diameter of particle size decreased from 62 to 40 microns as the amount of ethyl cellulose increased from 1 to 4 grams per 100 grams of cyclohexane. Further, the data clearly demonstrate that particle size is further reduced as the phase ratio increases. For example, at 2 grams of ethyl cellulose per 100 grams of cyclohexane, the median diameter of particle size decreased from 76 to 34 microns as the phase ratio increased from 10:1 to 20:1.

EXAMPLE II

The potential fog-seeding agents, urea and sodium chloride, were subjected to the above-described encapsulation process. It was found that the encapsulated aggregates could be prepared void of fines and in varying particle-sizes ranging from 20 to 200 microns (diameter). Particle number distributions are shown in Table II.

TABLE II

| Diameter in microns (size range) | Urea (frequency in number percent) | |
|---|---|---|
| | Unencapsulated | Encapsulated |
| 0–2 | 0 | 0 |
| 2–2.5 | 24 | 0 |
| 2.5–3.5 | 33 | 0 |
| 3.5–7 | 25 | 0 |
| 7–12 | 13 | 0 |
| 12–18 | 4 | 0 |
| 18–160 | 1 | 100 |
| The 18–160 micron size range:[1] | | |
| 18–32 | | 11 |
| 32–42 | | 21 |
| 42–66 | | 44 |
| 66–80 | | 14 |
| 80–105 | | 7 |
| 105–160 | | 2 |

[1] Encapsulated urea is distributed as follows.

Essentially, all of the unencapsulated urea particles were less than 18 microns in diameter. As will be shown, such small particles or fines are undesirable due to their agglomerating characteristics when exposed to humid conditions. Particle distribution for encapsulated ureas essentially was in the 20 to 100 micron (diameter) range with substantially no fines or small particles.

EXAMPLE III

Encapsulated aggregates prepared according to the process of Example I and unencapsulated materials were subjected to an empirical test method for determining the agglomerating tendency of the bulk powders when exposed to humid (90% relative humidity) environments. Fifty cc. of bulk powder were measured into a 120 cc. wide mouth bottle. The bottle is placed in a humidity chamber, maintained at 32° C., 90% relative humidity, for 120 minutes. The bottle is removed, capped and shaken vigorously by hand for 60 seconds. The sample then is placed on a 100 mesh (149 H) sieve-pan combination. The sieve is gently shaken until the screen is clearly free of fine material. The two fractions are collected, dried and weighed. The weight percent retained on the screen is calculated and is utilized as a measure of the degree of agglomeration occurring. The results are given in Table III.

TABLE III

| Material | Percent retained on 100 mesh screen | |
|---|---|---|
| | Before exposure | After exposure |
| Unencapsulated NaCl | 0 | 26 |
| Encapsulated NaCl | 0 | 2 |
| Unencapsulated urea [a] | 0 | 70–80 |
| Encapsulated urea [a] | 0 | 2–8 |
| Unencapsulated urea [b] | 5 | 80–90 |
| Encapsulated urea [b] | 7 | 10–16 |

[a] Fine grind.
[b] Coarse grind.

The encapsulated particles clearly are resistant to agglomeration as the percent of material retained on the mesh after exposure of the humid environment is substantially reduced in the encapsulated material, e.g., 2 to 8 percent as compared to 70 to 80 percent.

EXAMPLE IV

The water sorbing properties of particular encapsulations having the particle size and distribution deemed appropriate for fog-seeding purposes were determined using two analytical methods. A gravimetric method was employed whereby a sample, comprised of a few thousand particles, was subjected to a dynamic, humid (100% RH) atmosphere. The method is described in detail as follows.

An instrumental method was designed around the capabilities of a DuPont Thermal Gravimetric Analyzer (TGA) and Differential Thermal Analyzer (DTA), Models 950 and 900, respectively. A sorption sample cell was fabricated and fitted to the electrobalance portion of the TGA unit. The cell was constructed to allow the continuous flow of a humid atmosphere over a sample mounted on the balance beam. Operating the DTA and TGA isothermally allows the monitoring of sample weight versus time. The dynamic, humid environment is produced by bubbling compressed air through water in a thermostated chamber; a constant air velocity being maintained via a flow meter. The humidified atmosphere is then passed through the sorption cell containing the sample. The sorption cell is jacketed and is maintained at a temperature less than that of the incoming atmosphere. The humidity of the atmosphere is monitored with wet-dry Iron-Constantan thermocouples mounted in the atmosphere exit of the cell. The thermocouple e.m.f. (0° C. reference junction) are recorded versus time using a two-pen strip recorder. The wet-dry temperatures are converted from the thermocouple millivolt readings.

In practice, after extensive calibration, adjustment and technique development, reproducible results have been achieved by employing the following method. An aluminum balance pan (20 mm. diameter) is placed on the balance beam and tared. The tared pan is removed and carefully loaded by dusting on the sample. Sample quantities of less than 1.5 milligrams are essentially in achieving adequate dispersion of the particles. The loaded pan is replaced to the balance beam in the sorption cell, and the sample weight is recorded versus time. The dynamic atmosphere is maintained at a velocity of about 2 liters per minute and at a temperature of about 20° C. given a relative humidity of 96–100 percent. The recorded sample weight is corrected for a buoyancy effect produced by the atmosphere flow and the weight gain (percent) is calculated with respect to time (minutes).

Using the gravimetric method, the water sorption properties of unencapsulated and encapsulated sodium chloride powders and size distributions having comparable mean diameters were determined. The results of the comparison show that the weight gain for a given period of time for encapsulated sodium chloride is at least as high as that for unencapsulated sodium chloride. For example, after 30 minutes the encapsulated sodium chloride exhibited 500 percent weight gain, unencapsulated sodium chloride exhibited a 425 percent weight gain.

The second method of comparing the water sorption characteristics of unencapsulated and encapsulated hygroscopic particles involves an optical method for analyzing individual particles for the growth thereof, when the particles are exposed to a humid (100% RH), static atmosphere. In practice, discrete particles are placed on a horizontally-suspended, 10 micron diameter, glass thread. The thread and its mounting is placed over 2 cc. of water contained in an 8 cc. humidity cell. The assembly is placed on a microscope stage, and the particle diameters are determined optically using a reticle equipped microscope. The chamber containing the sample is closed with a glass cover-plate, and the particle growth versus time is measured by photomicrography. The results show the encapsulated granules to be at least as hygroscopic as their crystalline unencapsulated, counterparts of comparable dimensions. For example, after 300 seconds, a 100 percent relative humidity and a phase ratio of 10:1, the water-urea solution droplet resulting from encapsulated urea had a diameter of 95 microns, whereas unencapsulated urea had a diameter of 85 microns. Encapsulated urea having an external surface area of 700 cm.$^2$/cm.$^3$ sorbed essentially the same amount of water as unencapsulated urea having the same external surface area per volume. However, due to the porosity of the encapsulated urea, 3,500 cm.$^2$/cm.$^3$ of specific surface area was exposed, thereby demonstrating the high intra surface area to volume ratio of the encapsulated aggregates of this invention. Note, while the weight of urea in both cases was essentially the same, the specific surface area per volume for encapsulated urea was 5 times greater than for unencapsulated urea.

These results clearly exhibit that the produced capsules consist of a physical unit with a high intra surface area to volume ratio. Further, the encapsulated aggregate sorbs at least as much moisture as an equal weight of unencapsulated material without caking. This permits a higher initial water sorption rate in a humid environment than an unencapsulated particle of equal size. By increasing the surface area of a given particle through encapsulating, initial water uptake is increased without clumping and caking.

What is claimed is:

1. A process for producing relatively narrow particle size distributions of minute capsules, en masse, comprising the steps of:
   (a) establishing a system comprising
      (1) a major portion, by volume, of a solvent for a polymeric film-forming material when warm,
      (2) a solid polymeric film-forming material of ethyl cellulose at least partially soluble in the solvent of (1) when warm but becoming insoluble therein when cold, the remaining polymeric material being present as an immiscible liquid, and
      (3) particles of hydroscopic core material of urea or sodium chloride insoluble in the solvent (1) or the polymeric material of (2) in the solvent of (1);
   (b) warming and agitating the system to a temperature at which the polymeric material of (2) in the solvent of (1) forms a dispersed liquid phase and the particles of (3) are interspersed with and coated by the liquid phase dispersion of film-forming polymeric material to form liquid walled capsules;
   (c) with continued agitation cooling the system to a temperature at which the liquid wall gives up the solvent, leaving the particles coated with a seamless rigid film of the polymeric material,
wherein 2 to 7 parts by weight of the polymeric material are employed per 100 parts by weight of the solvent and the phase ratio of the particles to the polymeric material ranges from 10:1 to 30:1.

2. A process according to claim 1 comprising the additional step of
   (d) recovering the capsules from the system, leaving the depleted residue.

3. A process according to claim 1 wherein the solvent is cyclohexane.

4. A process according to claim 3 wherein the particle size ranges from 20 to 100 microns (average diameter).

5. A process according to claim 1 wherein the warm temperature is above room temperature and the insolubilization of the deposited wall polymer solution is achieved by cooling the solution to room temperature.

6. A proces according to claim 1 wherein the warming temperature is about 80° C. and the cooling temperature is about 20° C.

7. A process according to claim 1 wherein 2 to 4 parts by weight of the polymeric material are employed per 100 parts by weight of the solvent.

8. A minute capsule of a seamless rigid film of polymeric material of ethyl cellulose surrounding and retaining particles of hydroscopic core material of urea or sodium chloride wherein the capsule has a specific surface area ratio ranging from 2:1 to 10:1.

9. A capsule according to claim 8 wherein the specific surface area ratio ranges from 4:1 to 10:1.

References Cited

UNITED STATES PATENTS

| 3,531,418 | 9/1970 | Fanger et al. | 252—316 |
| 3,341,416 | 9/1967 | Anderson et al. | 252—316 X |
| 3,242,051 | 3/1966 | Hiestand et al. | 252—316 X |

RICHARD D. LOVERING, Primary Examiner

U.S. Cl. X.R.

117—100 A, 100 B; 239—2 R; 252—194, 384; 264—4